US007639616B1

(12) United States Patent
Manula et al.

(10) Patent No.: US 7,639,616 B1
(45) Date of Patent: Dec. 29, 2009

(54) ADAPTIVE CUT-THROUGH ALGORITHM

(75) Inventors: Brian Manula, Oslo (NO); Morten Schanke, Oslo (NO); Magne V. Sandven, Oslo (NO); Mathias Hoddevik, Langus (NO)

(73) Assignee: Sun Microsystems, Inc., Santa Clara, CA (US)

( * ) Notice: Subject to any disclaimer, the term of this patent is extended or adjusted under 35 U.S.C. 154(b) by 786 days.

(21) Appl. No.: 10/862,987

(22) Filed: Jun. 8, 2004

(51) Int. Cl.
G08C 15/00 (2006.01)
H04J 3/14 (2006.01)
H04L 1/00 (2006.01)
H04L 12/26 (2006.01)

(52) U.S. Cl. .................. 370/235; 370/395.31; 370/414

(58) Field of Classification Search ................ 370/389, 370/235, 395.31, 412–418; 379/272–277; 709/238–244; 711/221
See application file for complete search history.

(56) References Cited

U.S. PATENT DOCUMENTS

| | | | |
|---|---|---|---|
| 4,551,833 A | 11/1985 | Turner | |
| 4,896,319 A | 1/1990 | Lidinsky | |
| 5,812,195 A * | 9/1998 | Zhang | ................. 375/240.16 |
| 5,956,102 A | 9/1999 | Lane | |
| 6,115,376 A | 9/2000 | Sherer | |
| 6,201,829 B1 | 3/2001 | Schneider | |
| 6,289,015 B1 | 9/2001 | Warner | |
| 6,304,196 B1 | 10/2001 | Copeland | |
| 6,393,082 B1 | 5/2002 | Nakamura | |
| 6,407,682 B1 | 6/2002 | Jones | |
| 6,459,698 B1 | 10/2002 | Acharya | |
| 6,570,884 B1 | 5/2003 | Connery | |
| 6,606,328 B1 | 8/2003 | Susnow | |
| 6,718,392 B1 | 4/2004 | Krause | |
| 6,839,794 B1 | 1/2005 | Schober | |
| 6,851,059 B1 | 2/2005 | Pfister | |
| 6,898,752 B2 | 5/2005 | Tucker | |

(Continued)

FOREIGN PATENT DOCUMENTS

WO 02089405 A2 11/2002

(Continued)

OTHER PUBLICATIONS

Infiniband Architecture Specification, vol. 1, Release 1.0.a, Jun. 19, 2001.*

(Continued)

*Primary Examiner*—Seema S. Rao
*Assistant Examiner*—Jianye Wu
(74) *Attorney, Agent, or Firm*—Park, Vaughan & Fleming LLP (57) ABSTRACT

An Infiniband switch can have an input port and a plurality of output ports. The switch can be configured to interrogate at least a header portion of a received packet to determine an output port for the packet and to forward the packet to an output buffer associated with the determined output port. The switch can also be configured to determine an output buffer ratio in dependence upon at least an inbound data rate characteristic of the input port and an outbound data rate characteristic of the determined output port. The output port can be configured to commence onward transmission of the packet once a proportion of the packet conforming to the output buffer ratio has been written into the output buffer.

18 Claims, 7 Drawing Sheets

U.S. PATENT DOCUMENTS

| | | |
|---|---|---|
| 6,920,106 B1 | 7/2005 | Chou |
| 6,922,749 B1 | 7/2005 | Gil |
| 7,010,607 B1 | 3/2006 | Bunton |
| 7,020,160 B1 | 3/2006 | Achler |
| 7,061,899 B2 | 6/2006 | Walker |
| 7,072,343 B1 | 7/2006 | Waclawsky |
| 7,103,626 B1 | 9/2006 | Recio |
| 7,113,995 B1 | 9/2006 | Beukema |
| 7,124,241 B1 | 10/2006 | Reeve |
| 7,133,409 B1 | 11/2006 | Willardson |
| 7,150,021 B1 | 12/2006 | Vajjhala |
| 7,180,862 B2 | 2/2007 | Peebles |
| 7,221,650 B1 | 5/2007 | Cooper |
| 7,225,467 B2 | 5/2007 | Dapp |
| 7,237,016 B1 | 6/2007 | Schober |
| 7,245,627 B2 | 7/2007 | Goldenberg |
| 7,302,432 B2 | 11/2007 | Brown |
| 2001/0037435 A1 | 11/2001 | Van Doren |
| 2001/0056553 A1 | 12/2001 | Suzuki |
| 2002/0057699 A1 | 5/2002 | Roberts |
| 2002/0087383 A1 | 7/2002 | Cogger |
| 2002/0101967 A1 | 8/2002 | Eng |
| 2002/0118692 A1 | 8/2002 | Oberman |
| 2002/0147947 A1 | 10/2002 | Mayweather |
| 2002/0150106 A1 | 10/2002 | Kagan |
| 2002/0181455 A1 | 12/2002 | Norman |
| 2003/0005039 A1 | 1/2003 | Craddock |
| 2003/0021230 A1* | 1/2003 | Kuo et al. ................. 370/230 |
| 2003/0061379 A1 | 3/2003 | Craddock |
| 2003/0079019 A1* | 4/2003 | Lolayekar et al. ........... 709/226 |
| 2003/0093627 A1 | 5/2003 | Neal |
| 2003/0161429 A1 | 8/2003 | Chiang |
| 2003/0188056 A1 | 10/2003 | Chemudupati |
| 2003/0193942 A1 | 10/2003 | Gil |
| 2003/0200315 A1 | 10/2003 | Goldenberg |
| 2003/0223416 A1 | 12/2003 | Rojas |
| 2003/0223435 A1 | 12/2003 | Gil |
| 2003/0223453 A1 | 12/2003 | Stoler |
| 2004/0001503 A1 | 1/2004 | Manter |
| 2004/0022245 A1 | 2/2004 | Forbes |
| 2004/0039986 A1 | 2/2004 | Solomon |
| 2004/0071134 A1 | 4/2004 | Vadivelu |
| 2004/0073534 A1 | 4/2004 | Robson |
| 2004/0081394 A1 | 4/2004 | Biran |
| 2004/0085977 A1* | 5/2004 | Gaur ......................... 370/412 |
| 2004/0120254 A1 | 6/2004 | Rider |
| 2004/0213224 A1 | 10/2004 | Goudreau |
| 2004/0215848 A1 | 10/2004 | Craddock |
| 2004/0225734 A1 | 11/2004 | Schober |
| 2004/0252685 A1 | 12/2004 | Kagan |
| 2005/0058150 A1 | 3/2005 | Boles |
| 2005/0071472 A1 | 3/2005 | Arndt |
| 2005/0108395 A1 | 5/2005 | Brey |
| 2005/0111465 A1 | 5/2005 | Stewart |
| 2005/0138368 A1 | 6/2005 | Sydir |

FOREIGN PATENT DOCUMENTS

| | | |
|---|---|---|
| WO | 03075477 A2 | 9/2003 |

OTHER PUBLICATIONS

Xilinx: "Virtex-II Pro Platform FPGAs: Functional Description", Product Specification, Dec. 10, 2003, pp. 1-5, XP-002348226.

PCT International Search Report for International Application No. PCT/US2005/016775, 4 pages.

Written Opinion of the International Search Authority for International Application No. PCT/US2005/016775, 5 pages.

Bu, Long et al., "A Keyword Match Processor Architecture using Content Addressable Memory", GLSVSI'04, Apr. 26-28, 2004, Boston, Massachusetts, ACM, p. 372-376.

* cited by examiner

ADAPTIVE CUT-THROUGH ALGORITHM

RELATED APPLICATIONS

The present application is related to the following applications, all of which are filed on the same day and assigned to the same assignee as the present application:

"METHOD AND APPARATUS FOR VERIFYING SERVICE LEVEL IN A COMMUNICATIONS NETWORK" Ser. No. 10/863,019, Inventors: Bjorn Dag Johnsen, Christopher Jackson, David Brean and Ola Torudbakken;

"SWITCH METHOD AND APPARATUS WITH CUT-THROUGH ROUTING FOR USE IN A COMMUNICATIONS NETWORK" Ser. No. 10/863,016, Inventors: Bjorn Dag Johnsen, Hans Rygh and Morten Schanke;

"SWITCHING METHOD AND APPARATUS FOR USE IN A COMMUNICATIONS NETWORK" Ser. No. 10/862,970, Inventors: Bjorn Dag Johnsen, Christopher Jackson, David Brean, Ola Torudbakken, Steinar Forsmo, Hans Rygh, Morten Schanke;

"METHOD AND APPARATUS FOR SOURCE AUTHENTICATION IN A COMMUNICATIONS NETWORK" Ser. No. 10/863,854, Inventors: Bjorn Dag Johnsen, Christopher Jackson, David Brean, Ola Torudbakken;

"CREDIT ANNOUNCEMENT" Ser. No. 10/863,373, Inventors: Morten Schanke, Hans Rygh, Marius Hansen and Mathias Hoddevik;

"COMMA DETECTION" Ser. No. 10/863,374, Inventors: Magne Sandven, Morten Schanke and Brian Manula;

"SERVICE LEVEL TO VIRTUAL LANE MAPPING" Ser. No. 10/862,985, Inventors: Steinar Forsmo, Hans Rygh and Ola Torudbakken;

"INPUT AND OUTPUT BUFFERING" Ser. No. 10/863,038, Inventors: Hans Rygh, Morten Schanke, Ola Torudbakken and Steinar Forsmo;

"CODEC IMPLEMENTATION FOR INFINIBAND" Ser. No. 10/863,439, Inventors: Steinar Forsmo, Mathias Hoddevik and Magne Sandven;

"VCRC CHECKING AND GENERATION" Ser. No. 10/863,013, Inventors: Steinar Forsmo, Hans Rygh, Morten Schanke and Ola Torudbakken;

"COMMUNITY SEPARATION ENFORCEMENT" Ser. No. 10/863,544, Inventors: Ola Torudbakken and Bjorn Dag Johnsen;

"STUMPING MECHANISM" Ser. No. 10/863,372, Inventors: Brian Manula, Ali, Bozkaya and Magne Sandven.

The above-identified applications are all hereby incorporated by reference into the present application.

FIELD

The present invention relates to an adaptive cut-through algorithm, and in particular but not exclusively to an adaptive cut-through algorithm for latency optimisation in an Infiniband™ device such as a switch.

INTRODUCTION

In switches for Infiniband™ networks, there is a general requirement to reduce the latency through the switch such that transmission times of packets across the network can be reduced. One source of latency within conventional Infiniband™ switches can occur where a mismatch in link bandwidths occurs between ports of a switch. This is conventionally handled by a so-called store and forward system where a received packet is stored in its entirety before being forwarded on to avoid under-running an output buffer. In such a system, the latency is entirely dependent upon packet size.

SUMMARY OF THE INVENTION

The present invention has been made, at least in parts, in consideration of problems and drawbacks of conventional systems.

Viewed from a first aspect, the present invention provides a method of routing a packet between an input port and an output port of an Infiniband device. The method can comprise: storing the packet in an output buffer associated with the output port; calculating a buffer ratio in dependence upon a bandwidth characteristic of the input port and a bandwidth characteristic of the output port; and commencing transmission of the packet from the output port once a portion of the packet sufficient to satisfy the buffer ratio has been stored in the output buffer. This method provides a technique for moving packets for onward transmission from an Infiniband device to be so forwarded in a latency optimised manner, thereby providing a performance benefit to an Infiniband fabric in which the device is located.

Viewed from a second aspect, the present invention provides an Infiniband device. The Infiniband device can comprise: an input port for receiving a packet; an output port for transmitting the packet; an output buffer associated with the output port for storage of the packet prior to transmission thereof from the output port; and a buffer ratio determiner for determining a buffer ratio in dependence upon a bandwidth characteristic of the input port and a bandwidth characteristic of the output port. The output port can be configured to commence transmission of the packet from once a portion of the packet sufficient to satisfy the buffer ratio is stored in the output buffer. This arrangement provides a device operable to retransmit received packets according to a latency optimised system. Thereby a performance benefit can be realised in any Infiniband fabric in which the device is located.

Viewed from a third aspect, the present invention provides an Infiniband switch that can have an input port and a plurality of output ports. The switch can be configured to interrogate at least a header portion of a received packet to determine an output port for the packet and to forward the packet to an output buffer associated with the determined output port. The switch can also be configured to determine an output buffer ratio in dependence upon at least an inbound data rate characteristic of the input port and an outbound data rate characteristic of the determined output port. The output port can be configured to commence onward transmission of the packet once a proportion of the packet conforming to the output buffer ratio has been written into the output buffer.

Particular and preferred aspects and embodiments of the invention are set out in the appended independent and dependent claims.

BRIEF DESCRIPTION OF FIGURES

Specific embodiments of the present invention will now be described by way of example only with reference to the accompanying figures in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF SPECIFIC EMBODIMENTS

One particular computer networking architecture is the Infiniband™ architecture. Infiniband™ is a standard architecture defined and administered by the Infiniband™ Trade Association, which was founded by Compaq, Dell, Hewlett-Packard, IBM, Intel, Microsoft and Sun Microsystems. The Infiniband™ Architecture defines a System Area Network (SAN) for connecting multiple independent processor platforms (i.e. host processor nodes), I/O platforms and I/O devices. A full definition of the Infiniband™ Architecture may be found in the Infiniband™ Architecture Specification Volumes 1 and 2, available from the Infiniband™ Trade Association. Infiniband™ defines a standard for flexible and high speed interconnect between computing systems or parts of computing system such as processor and I/O nodes. Infiniband™ allows an order of magnitude more flexibility and scalability than conventional bus based systems through a highly hardware coupled and low latency interface, which is a key factor in multiprocessing architectures.

The Infiniband™ Architecture SAN is a communications and management infrastructure supporting both I/O and interprocessor communications for one or more computer systems. An Infiniband™ Architecture system can range from a small server with one processor and a few I/O devices to a massively parallel supercomputer installation with hundreds of processors and thousands of I/O devices.

The Infiniband™ Architecture defines a switched communications fabric allowing many devices to concurrently communicate with high bandwidth and low latency in a protected, remotely managed environment. An endnode can communicate with over multiple Infiniband™ Architecture ports and can utilise multiple paths through the Infiniband™ Architecture fabric. A multiplicity of Infiniband™ Architecture ports and paths through the network are provided for both fault tolerance and increased data transfer bandwidth.

Infiniband™ Architecture hardware off-loads from the CPU much of the I/O communications operation. This allows multiple concurrent communications without the traditional overhead associated with communicating protocols. The Infiniband™ Architecture SAN provides its I/O and interprocessor communications clients zero processor-copy data transfers, with no kernel involvement, and uses hardware to provide highly reliable, fault tolerant communications.

Figure 1:
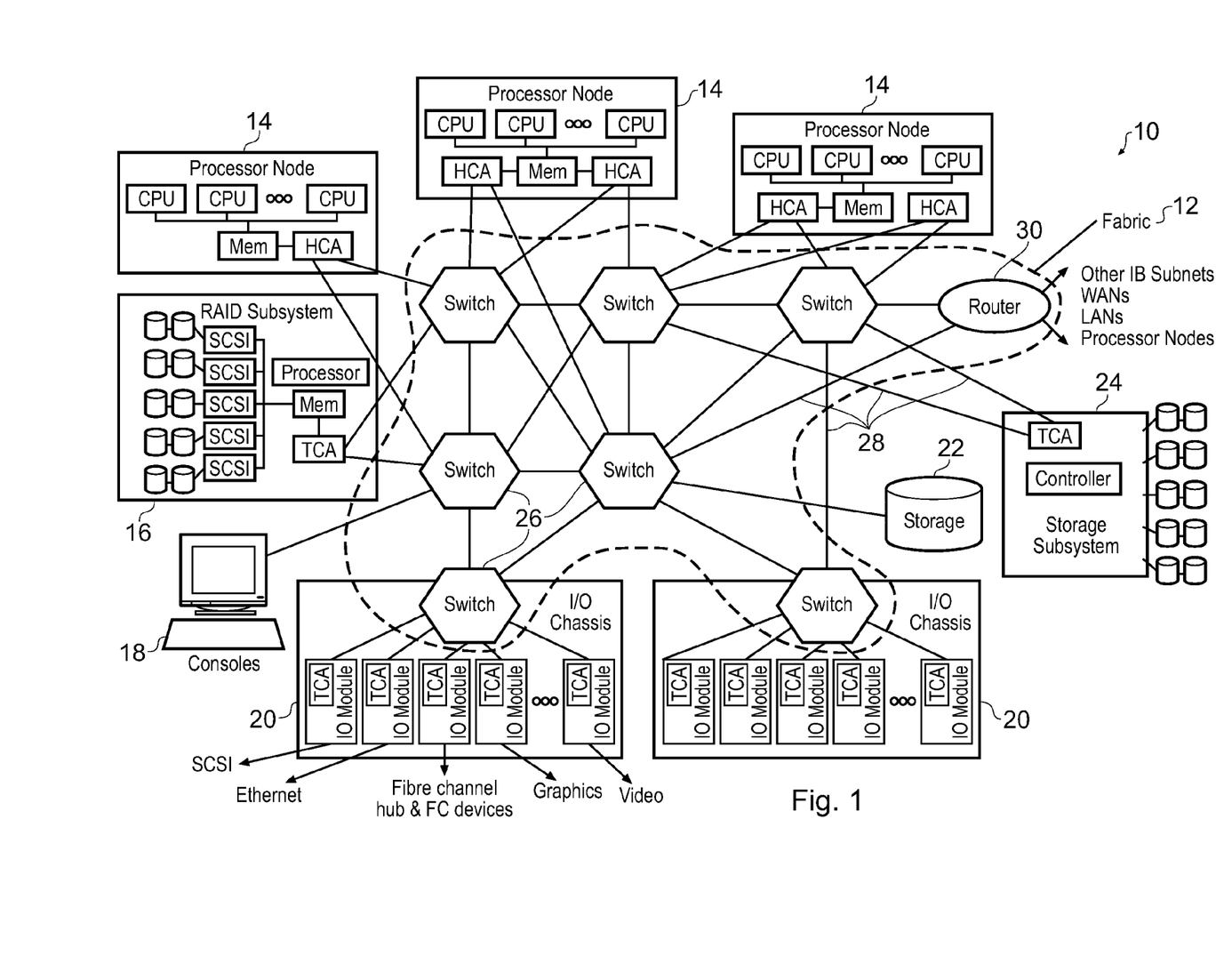
FIG. 1 is a schematic block diagram showing an example of interconnection of computing system elements via the Infiniband™ networking architecture.

An example of an Infiniband™ Architecture System Area Network is shown in FIG. 1. As can be seen from FIG. 1, a System Area Network 10 comprises an Infiniband™ Architecture fabric (or Subnet) 12 made up of cascaded switches and routers. The fabric 12 provides links between a number of processor nodes 14 and other nodes including a Raid Subsystem 16, consoles 18, I/O Chassis 20, Storage 22 and a Storage Subsystem 24. The Fabric 12 is made up of a plurality of switches 26 having interconnections 28 providing data connections therebetween and between the nodes attached to the fabric 12. Also comprised in the fabric 12 is a router 30 for providing connections to and from other networks, which may be other Infiniband™ Architecture subnets, non-Infiniband™ Architecture LANs and WANs and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, raid subsystems 16, consoles 18, I/O Chassis 20, Storage 22 and Storage Subsystems 24 are known as endnodes 32.

Each endnode 32 has therein a Channel Adapter, which may be a Host Channel Adapter (HCA) or a Target Channel Adapter (TCA). Host Channel Adapters are to be found in processor nodes 14, and Target Channel Adapters are to be found in I/O Nodes 16, 18, 20, 22 and 24. Host Channel Adapters are configured to issue requests across the fabric 12, and Target Channel Adapters are configured to respond to such requests, for example by supplying requested data or storing supplied data. Each Channel Adapter uses a queuing system based on Queue Pairs, one queue for send operations and one for receive operations. Each Queue Pair may therefore be considered to provide a virtual communication port of a Channel Adapter. Each Channel Adapter may have up to $2^{24}$ Queue Pairs, which may be assigned individually or in combination to handle operations affecting different parts (or consumers) of the endnode 32. For example, a processor node 16 may comprise a plurality of processors and each processor may have one or more individual Queue Pairs assigned to handle requests and responses flowing to and from that processor of that processor node 16 via the fabric 12. Alternatively, or in addition, a processor of a given processor node 16 may be running more than one process and each process may have one or more Queue Pairs assigned to handle requests and responses flowing to and from that process via the fabric 12.

The interconnects 28 may be one of three classes, 1×, 4× or 12×, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
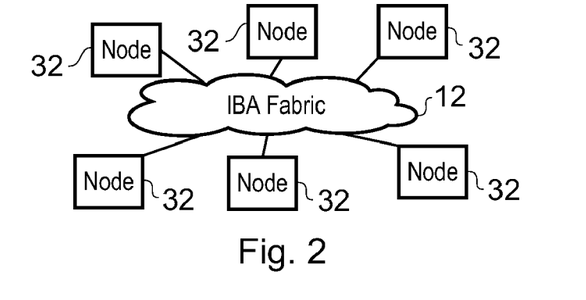
FIG. 2 is a schematic block diagram of a simplified arrangement of an Infiniband™ Architecture system.
Figure 3:
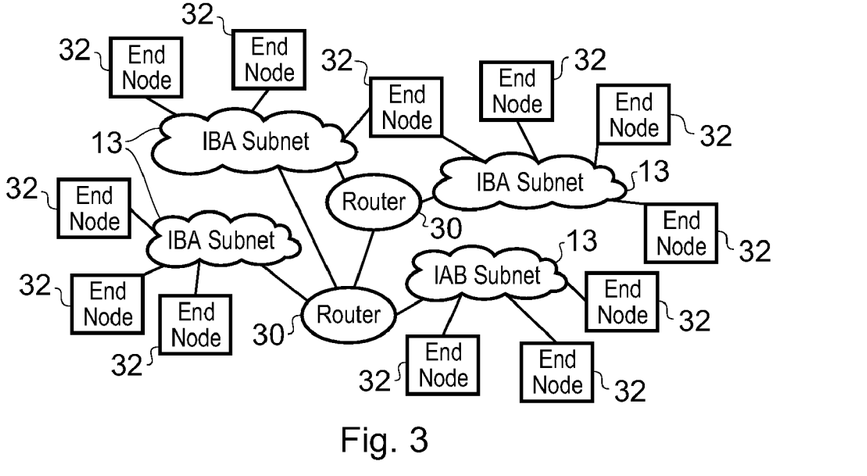
FIG. 3 is a schematic block diagram of another simplified arrangement of an Infiniband™ Architecture system.
Figure 4:
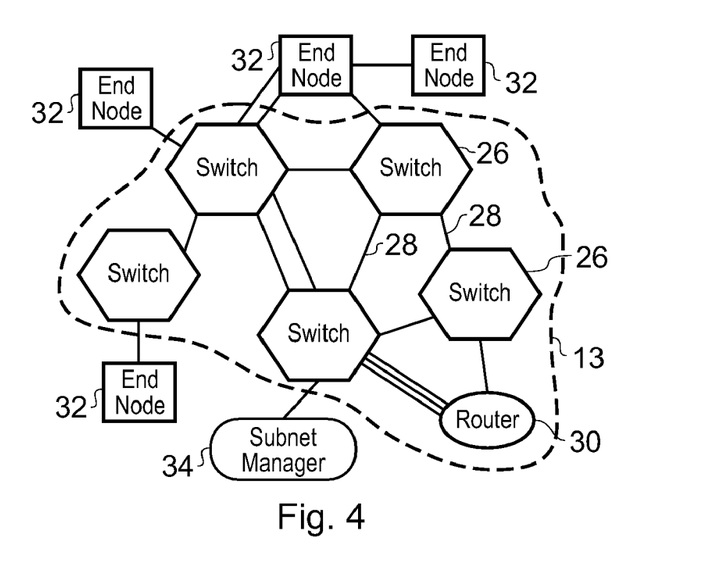
FIG. 4 is a schematic block diagram of a further simplified arrangement of an Infiniband™ Architecture system.

Examples of possible Infiniband™ Architecture topologies are shown in FIGS. 2, 3 and 4. FIG. 2 shows a high level simplified topology example where a number of endnodes 32 are interconnected by the fabric 12. An Infiniband™ Architecture network may be subdivided into subnets 13 interconnected by routers 30 as illustrated in FIG. 3. Any particular endnode 32 may be attached to a single subnet 13 or to multiple subnets 13. Shown in FIG. 4 is an example of the structure of a subnet 13. The subnet 13 comprises endnodes 32, switches 26, routers 30 and subnet managers 34 interconnected by links 28. Each endnode 32 may attach to a single switch 26, multiple switches 26 and/or directly with each other. In the case of direct connection between endnodes 32, the two or more directly linked endnodes effectively form an independent subnet with no connectivity to the remainder of the devices attached to the main subnet and one of the interconnected endnodes functions as the subnet manager for that link.

Figure 5:
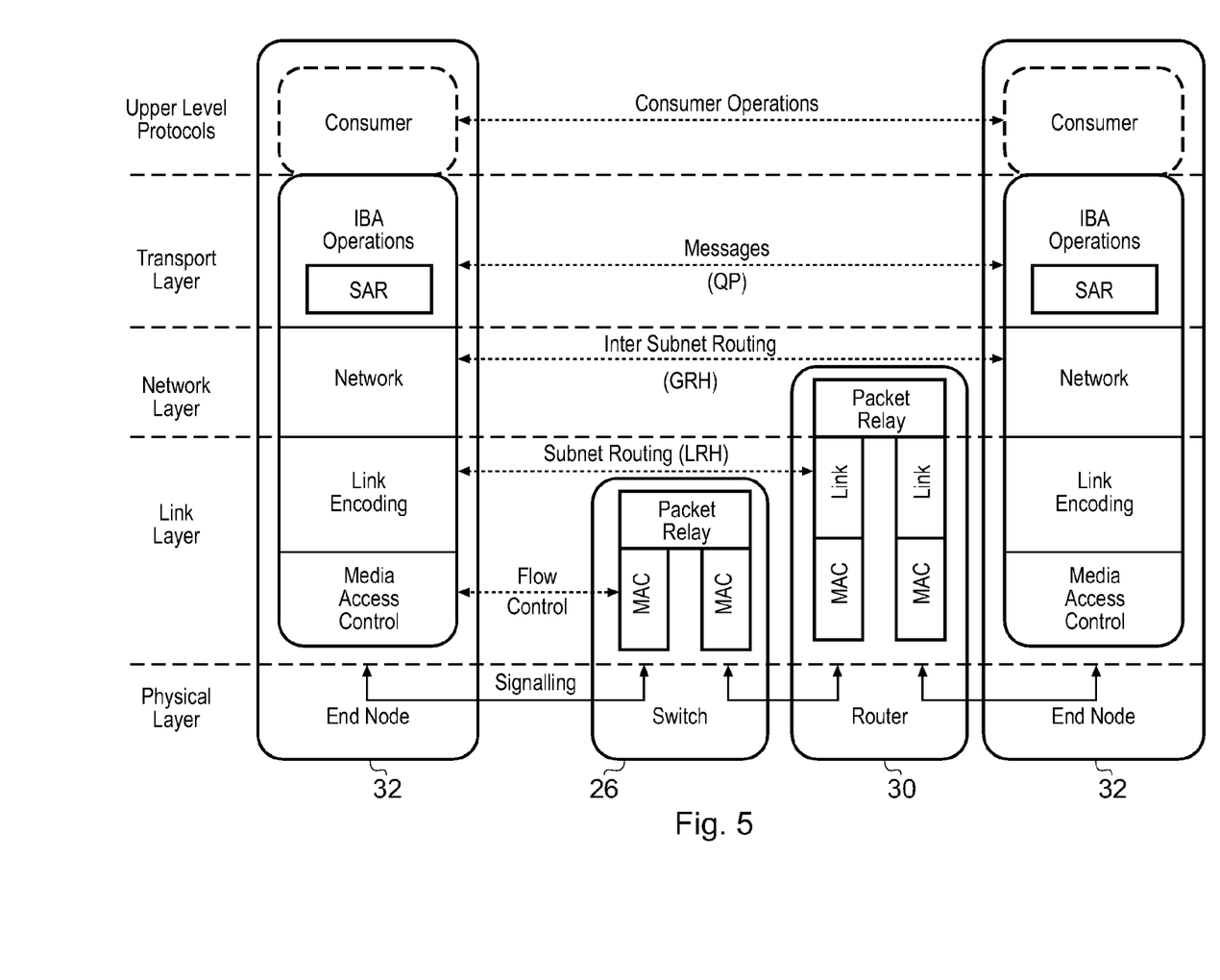
FIG. 5 shows a schematic illustration of the architecture layers of an Infiniband™ Architecture system.

Referring now to FIG. 5, there is shown an illustration of the architecture layers of an Infiniband™ Architecture system. Starting with the physical layer, this specifies how bits are placed onto the interconnections 28 and defines the symbols used for framing (i.e. start of packet and end of packet), data symbols and fill between packets (idles). It also specifies the signalling protocol as to what constitutes a validly formed packet (i.e. symbol encoding, proper alignment of framing symbols, no invalid or non-data symbols between start and end delimiter, no disparity errors, synchronisation method, etc.). The signalling protocol used by the Infiniband™ Architecture utilises a differential signal. The physical (or ethereal) interconnects 28 between nodes of an Infiniband™ Architecture network are normally provided by electrical signal carriers such as copper cables or optical signal carriers such as optical fibres. As discussed above, the maximum data rate of the interconnect is limited by the bandwidth of the selected channel. The physical layer also includes deskewing circuitry for compensating for skew latency in the channels.

Figure 6:
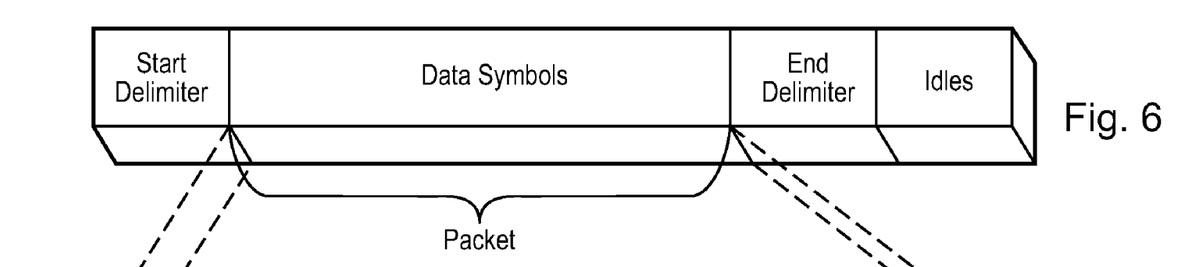
FIG. 6 shows schematically the structure of a message to be transmitted via an Infiniband™ Architecture.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

Figure 7:
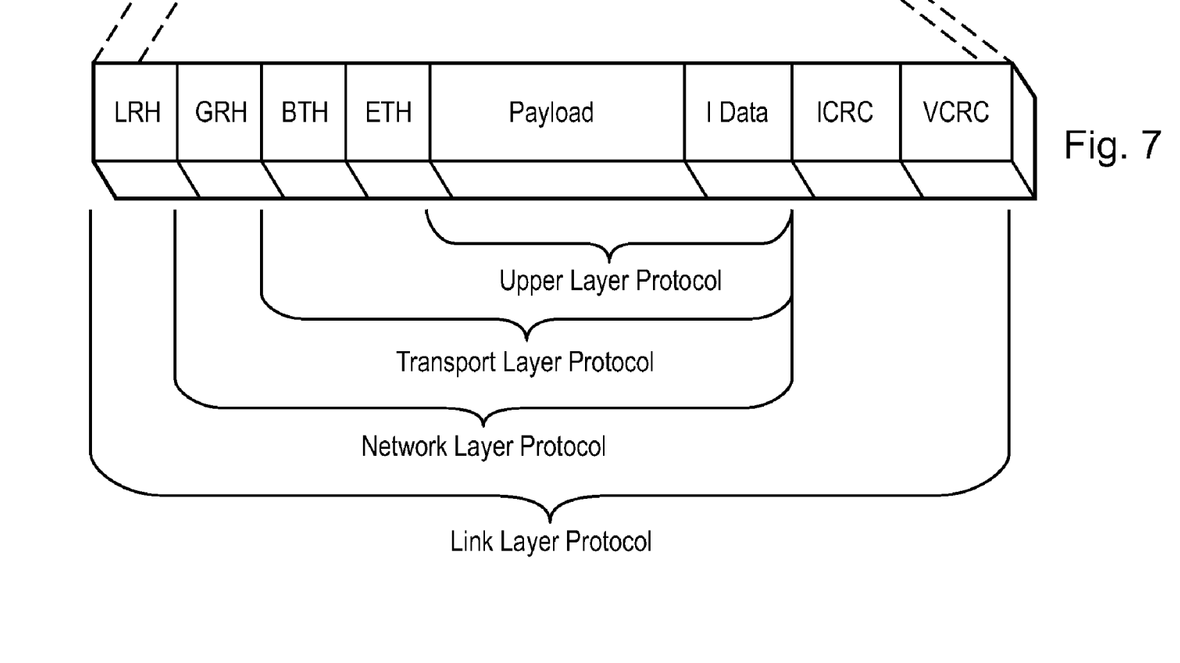
FIG. 7 shows schematically the format of a packet of the message of FIG. 6.

The data packet format is illustrated in FIG. 7. Packets may be one of two types, IBA (Infiniband™ Architecture) Packets or RAW (non-Infiniband™ Architecture) Packets. IBA Packets have IBA defined transport headers, are routed on Infiniband™ Architecture fabrics 12, and use native Infiniband™ Architecture transport facilities. Raw Packets may be routed on IBA fabrics but do not contain Infiniband™ Architecture transport headers. From the Infiniband™ point of view, these packets contain only Infiniband™ routing headers, payload and CRC. Infiniband™ Architecture does not define the processing of these packets above the link and network layers. These packets can be used to support non-Infiniband™ Architecture transports (e.g. TCP/IP, IPX/SPX, NetBUI etc) over an Infiniband™ fabric.

The Link Layer describes the packet format and protocols for packet operation, e.g. flow control and how packets are routed within a subnet between the source and the destination. Packets may be data packets which convey data between endnodes and which consist of a number of different headers which may or may not be present. Alternatively packets may be Link Management Packets which are used to train and maintain link operation. These packets are used to negotiate operational parameters between the ports at each end of the link such as bit rate, link width etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sending data packets. The receiver is the consumer of the data packets. Each end of the link has a transmitter and a receiver. The Infiniband™ Architecture utilises an "absolute" credit based flow control scheme that is to say that Infiniband™ Architecture receivers provide a "credit limit". A credit limit is an indication of the total amount of data that the transmitter has been authorised to send since link initialisation.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The Infiniband™ Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the Link Layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The Network Layer, which is present only within routers 30 and endnodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header but the source and destination port identities are not changed and are protected by the Invariant Cyclic Redundancy Check. Thus the Network and Link Layers operate together to deliver a packet to the desired destination.

The Transport Layer, which is present only within endnodes 32, delivers the packet to the proper Queue Pair within the Channel Adapter of the destination endnode 32 and instructs that Queue Pair as to how the packet's data should be processed. The transport layer also has responsibility for segmenting an operation into multiple packets when the message's data payload is greater than the maximum payload carryable by a single packet. The receiving Queue Pair then reassembles the data from the multiple packets at the destination endnode 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write etc). A number of Extended Transport Headers (ETH) may be present conditional on the class of service and operation code.

The Packet Sequence Number is initialised for a given Queue Pair as part of the communications establishment process and increments each time that Queue Pair creates a new packet. The receiving Queue Pair tracks the received Packet Sequence Number to determine whether any packets have been lost. For reliable service, the receiver endnode 32 may transmit and acknowledge signal back to the originator endnode to indicate whether all packets have been received successfully.

The Upper Level Protocols are completely software based and may comprise any number of protocols used by various user consumers. The payload is the data carried by the packet and I Data is handling data associated with a work activity to be performed on the payload. Also present in the Upper Level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an endnode 32.

Figure 8:
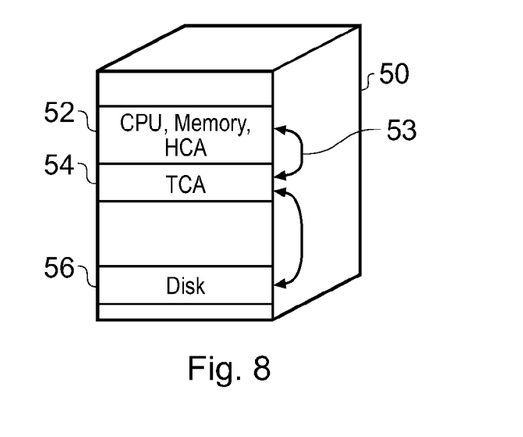
FIG. 8 is a schematic block diagram showing an arrangement where the Infiniband™ Architecture is used to interconnect components within a computer system.

Examples of simple Infiniband™ Architecture systems are shown in FIGS. 8 and 9. FIG. 8 shows an arrangement where the Infiniband™ Architecture is used to interconnect components within a standard computer system rack 50. In this example, the CPU, Memory and a Host Channel Adapter 52 are interconnected using conventional non-Infiniband™ Architecture techniques. The Host Channel Adapter of the CPU, Memory and Host Channel Adapter 52 communicates via an Infiniband™ Architecture interconnect 53 with a Target Channel Adapter 54. The Target Channel Adapter 54 communicates with a disk drive unit 56 via a SCSI (Small Computer System Interface) connection. Thus the Infiniband™ Architecture is configured in this example to facilitate communications between elements of the same computer system.

Figure 9:
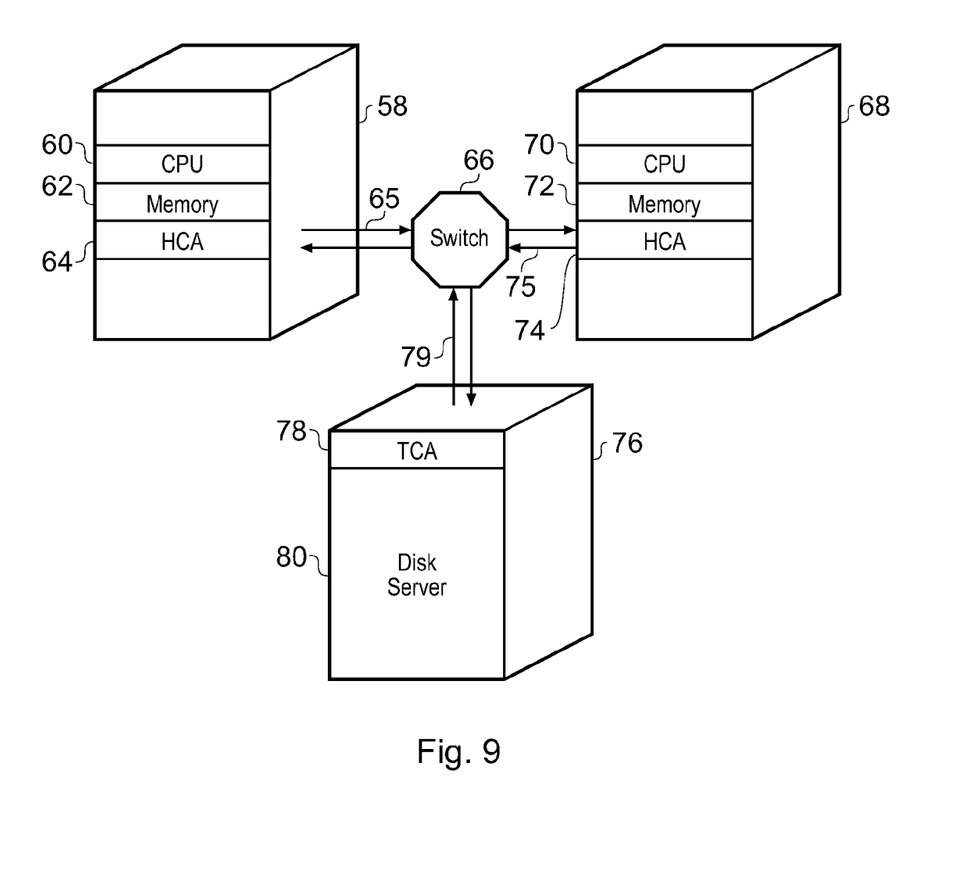
FIG. 9 is a schematic block diagram showing an arrangement where the Infiniband™ Architecture is used as an interconnect between computer systems.

FIG. 9 shows an arrangement where the Infiniband™ Architecture is used only as an interconnect between computers. In this example a first computer system is mounted in a rack 58 and comprises a CPU 60, memory 62 and a Host Channel Adapter 64 interconnected via conventional non-Infiniband™ Architecture techniques. Via the Host Channel adapter 64, the first computer system communicates to and from a Switch 66 across interconnects 65. Also connected to the Switch 66 is a second computer system mounted in a rack 68 and comprising a CPU 70, memory 72 and a Host Channel Adapter 74 which connects to the switch 66 via interconnects 75. Data storage for the first and second computer systems is provided by a disk server 80 mounted in a rack 76. The disk server 80 connects with a Target Channel Adapter 78 also mounted within the rack 76 by conventional non-Infiniband™ Architecture techniques. The Target Channel Adapter 78 connects to the switch 66 via interconnects 79. Thus the Infiniband™ Architecture is configured in this example to facilitate communication between more than one distinct computer systems. There is no limitation that the techniques of the examples of FIGS. 8 and 9 should be practised separately, a computer system using the Infiniband™ Architecture for internal communications may also be connected to other computer systems via a network based on the Infiniband™ Architecture.

Thus there has now been described an overview of the Infiniband™ Architecture for computer networking with examples of how it may be put into practice. Further details may be found in the above referenced Infiniband™ Architecture Specification Volumes 1 and 2, available from the Infiniband™ Trade Association, the contents of which are hereby incorporated hereinto by reference.

Figure 10:
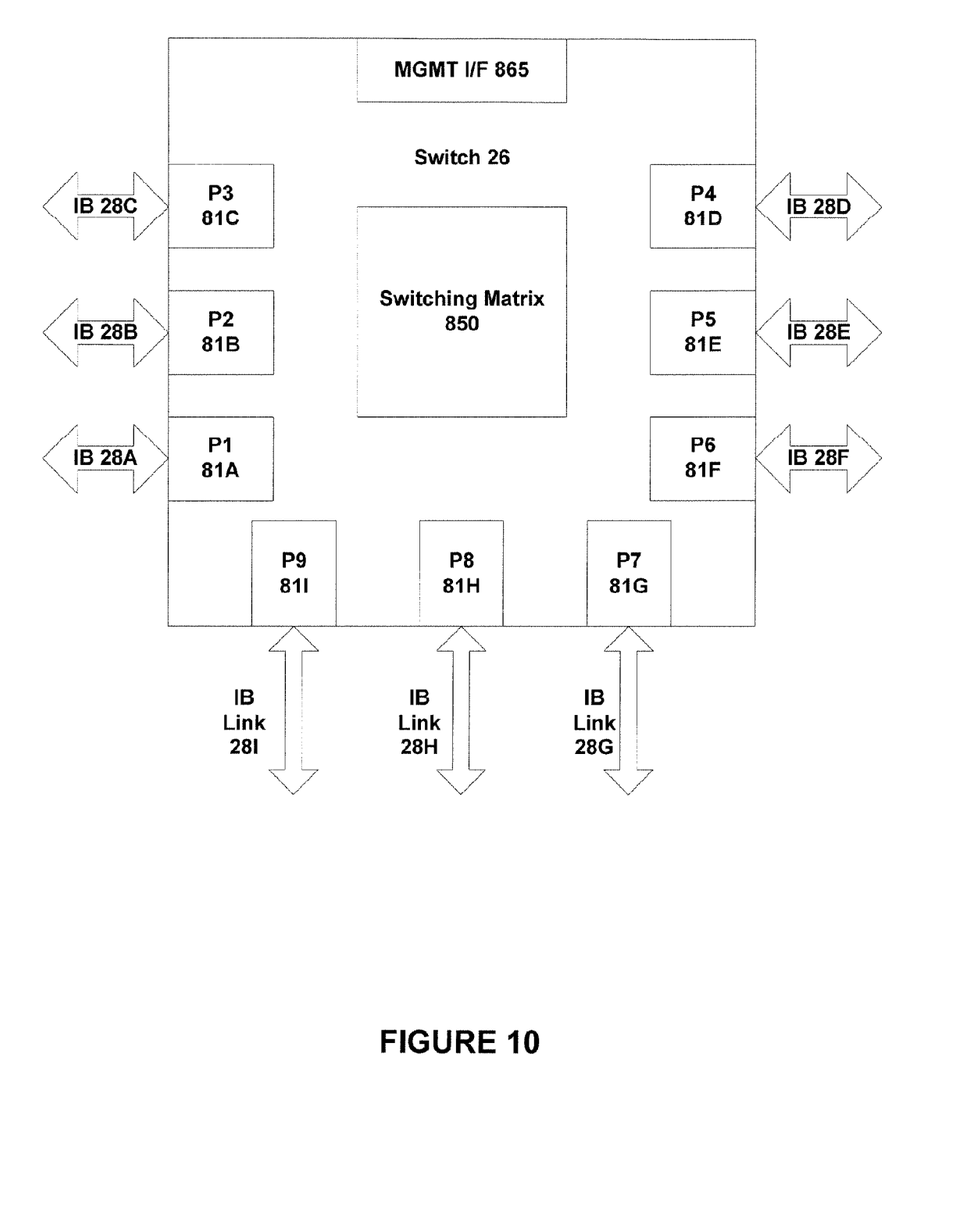
FIG. 10 is a schematic block diagram showing an example of a switch suitable for use in an Infiniband™ network.

FIG. 10 illustrates an example of a switch 26 suitable for use in an Infiniband fabric 12. Switch 26 can be implemented as a semiconductor device, for example an application specific integrated circuit (ASIC), and includes a management control interface 865, a subnet management agent (SMA) 866, multiple ports 81, and a switching matrix 850.

The management interface 865 provides access to the switch 26 for one or more external control systems, and can be used to configure switch 26 as appropriate depending upon the circumstances. For example, the subnet management agent 866 can communicate with the subnet manager 34 (see FIG. 4) via management interface 865.

In the present example, switch 26 has nine ports 81, denoted in FIG. 10 as P1 81A, P2 81B, P3 81C, P4 81D, P5 81E, P6 81F, P7 81G, P8 81H, and P9 81I. Each port is attached to a corresponding Infiniband duplex link 28 providing transmit (Tx) and receive (Rx) capability, and comprising one, four or twelve physical lanes. Each physical lane provides a basic data rate of 2.5 GHz, so that switch 26 provides connectivity for a total of 96 (9×12) lanes. The physical lanes into any given port are managed as a single logical link, and can be flow controlled using a credit-based link level flow control, as described above.

In accordance with the Infiniband Architecture, each link 28 can be subdivided into a maximum of sixteen virtual lanes (VL) to provide logically separate channels that are multiplexed onto a single logical link. The first fifteen virtual lanes (denoted VL0 through VL14) support general purpose data communications, while the remaining virtual lane (denoted VL15) is used for special management purposes. (Note that virtual lane VL15 is not flow-controlled, and so should be considered as not reliable). An Infiniband switch must support at least two virtual lanes on each link (i.e. data lane VL0 and management lane VL15). In one example, switch 26 supports four virtual lanes for general data communication plus one virtual lane for management purposes (VL15).

In accordance with the Infiniband Architecture, a packet can be specified as having one of sixteen different service levels (SLs). The service level for a particular packet is specified in the local route header (LRH), and remains constant as the packet transits an Infiniband subnet. The SL value in the packet determines the virtual lane over which the packet is transmitted across any given link in the subnet. This is achieved by having a switch maintain a set of SL-to-VL mappings (which are specific to each input port/output port combination). The SL-to-VL mappings are initialized and maintained by the subnet manager 34 (see FIG. 4).

On receipt of an incoming packet, a port first determines the output port to forward the packet to, based on the DLID value in the packet (as explained in more detail below). The port then uses the SL-to-VL mappings to decide the virtual lane over which the packet should be sent, given the SL value in the packet and the output port from which the packet will be transmitted. Note that since different switches may support different numbers of virtual lanes, a packet may be assigned to different virtual lanes for different links of its journey across a subnet.

The range of service levels can be used to provide a quality of service (QoS) mechanism in an Infiniband network. Thus any given virtual lane can be classified as low priority or high priority, and assigned a weight within that classification. The weight and classification of a virtual lane control its access to the bandwidth of the physical link, relative to the other virtual lanes supported over the same link. The service level of a packet then determines the virtual lane utilised by the packet over the link, in accordance with the SL-to-VL mappings. These mappings can be configured to reflect the number of virtual lanes provided by any given link and also the quality of service policy of the network.

The Infiniband Architecture supports the concept of partitioning in order to provide logical isolation of components sharing the same subnet. All nodes included in a route from a source to a destination must share the same 16-bit partition key (PK), otherwise they are unable to communicate with one another (or even to recognise each other's existence). An individual node may support multiple partition keys, and so belong to multiple different partitions.

A member of a partition can be denoted as a full member or a limited (partial) member, dependent on the high-order bit of the partition key. A full member can communicate with either a limited member or a full member, but a limited member cannot communicate with another limited member of that partition (only a full member). This model corresponds to a client-server architecture, where servers are full members and clients are partial members, and clients do not need generally to talk directly to one another.

Each queue pair at an end node has a partition key table which is assigned to it by the subnet manager 34 (see FIG. 4). A queue pair is assigned an index into the partition key table, and can then use this index to obtain and store the appropriate partition key into the local route header (LRH) for each outgoing packet. Conversely, a queue pair receiving a packet checks that the Pkey value within the incoming packet matches the indexed Pkey value in the Pkey table (if not, the incoming packet is discarded).

Each port 81 on switch 26 is provided with an input buffer (not shown in FIG. 10). The input buffer receives data arriving at a port 81 over its respective link 28, and stores this data pending transfer through the switching matrix 850. In the example mentioned above, each input buffer is divided into four sections, corresponding to the four virtual lanes on the associated link 28. This ensures that data from different virtual lanes is kept properly isolated.

Switching matrix 850 is used to transport data from one port to another. For example, if data arrives on link 28D at port P4 81D and is to be forwarded on link 28A, then switching matrix 850 is responsible for transferring the data from port P4 81D to port P1 81A (corresponding to link 28A). It will be appreciated that while ports 81 are constrained by the Infiniband standard (in order to ensure network connectivity), to some extent switching matrix 850 can be regarded as a more generic switching device, since it is internal to switch 26 and therefore shielded (at least in part) from other network devices.

The Infiniband architecture supports two general modes of communication. The first of these is unicast or point-to-point, in which each data packet goes from a single source to a single destination. This translates into switching matrix 850 transferring a packet from one incoming port to one outgoing port. The other mode of communication in Infiniband is multicast, in which a packet may be routed from a single source to multiple destinations. This is mirrored in the passage of the packet through switching matrix 850, whereby a packet from an incoming port may be directed to multiple outgoing ports.

It is desirable for the switch 26 to have low latency and high efficiency. A low latency implies relatively small amounts of buffering, otherwise delays through the switch will tend to increase. A high efficiency implies that the performance of the switch 26 is not degraded due to competition for resources within the chip as the load (i.e. the traffic through the switch) rises.

As part of the start-up procedure of an Infiniband network, the subnet manager 34 (see FIG. 4) assigns each end-node port in a subnet a local identifier (LID). Note that the individual ports 81 in switch 26 are not assigned their own LIDs, although an LID is assigned to port 0 of switch 26, which can be regarded as corresponding to management interface 865. (The switch management port, i.e. port 0, is considered an end-node in the Infiniband network, unlike the other switch ports).

Each LID comprises two portions, a base LID and a number of path bits. The number of path bits in the LID for a given port is determined by the LID mask count (LMC), which is also assigned by the subnet manager 34. Each packet in transit on the subnet contains the LID of the port from which it originated, namely the source LID (SLID), and also the LID for the port to which the packet is going, namely the destination LID (DLID). The SLID and the DLID are incorporated into the local route header (LRH) of the packet.

When a packet is received at its destination, the port checks that the DLID in the packet matches the LID for that port. Note that in this comparison the path bits of the LID are masked out, so that in effect the comparison is made against the base LID for the port. Thus for the purpose of destination checking, the path bits are ignored. However, in terms of routing a packet through a switch, the path bits are taken into consideration. This then allows multiple paths to be specified that all arrive at the same destination port. The ability to provide multiple paths through a subnet to the same destination port aids robustness and reliability within the network.

One source of latency within an Infiniband switch occurs when a packet arrives on a link which has a different maximum transfer capability to the link on which the packet is to be output. That is, where the maximum number of lanes on the inbound link (e.g. 1×, 4×, or 12×) is greater than or less than the maximum number of lanes on the outbound link (e.g. 1×, 4× or 12×).

By way of comparison, an example of equal width inbound and outbound links will be described with reference to FIG. 10. If, for example the Infiniband link 28A to switch port P1 81A is a 4× link, and the Infiniband link 28E attached to switch port P5 81E is a 4× link, then any packet which arrives at port P1 81A and leaves via port P5 81E will be able to pass straight through the switch. In this case, the inbound data rate matches the outbound data rate, so there is no need for the data to sit in a buffer for any length of time. In fact, in some examples, if the transmit port is ready to receive data for transmission at the time that the receive port commences receipt of the incoming packet, any input and/or output buffer associated with the inbound port or the outbound port can be bypassed to further minimise latency.

However, in the case of mismatched inbound and outbound link bandwidths, in order to avoid latency caused by such bandwidth mismatches, the switch of the present example can use a controlled cut-through arrangement. The controlled cut-through arrangement of the present example can optimise the transfer of data packets through in Infiniband switch to minimise latency within the switch.

In the present example, a transfer of a data packet from switch port P2 81B to port P4 81G will be considered. For the purposes of this example, it will be assumed that the inbound link to port P2 is a 4× link and the outbound link from P4 is a 12× link. Thus the onward data transfer occurs at a rate of 3 times the inbound data transfer rate. As will be appreciated, this situation can cause problems as simply outputting the data over the output link would result in a corrupted packet as a large amount of random data would be transmitted mixed in with the packet data due to output buffer under-run.

In the present example, an input buffer is associated with the switch port receiving a data packet, which buffer stores the packet until the packet has been sufficiently interrogated to determine the onward path of the packet. Once such an onward path has been determined, assuming that the onward path is via a port of the switch (i.e. not to the management interface of the switch), the packet is transferred to an output buffer associated with an output port corresponding to the determined onward path of the packet. The packet is then transmitted from the output port, taking the data from the output buffer.

Accordingly, in the present example, a forwarding control algorithm is used to control forwarding of the packet from the output buffer to avoid buffer under-run causing corruption of a data packet, whilst optimising the transmission for minimal latency. An example of an implementation of such an algorithm will now be described with reference to FIG. 11.

Figure 11:
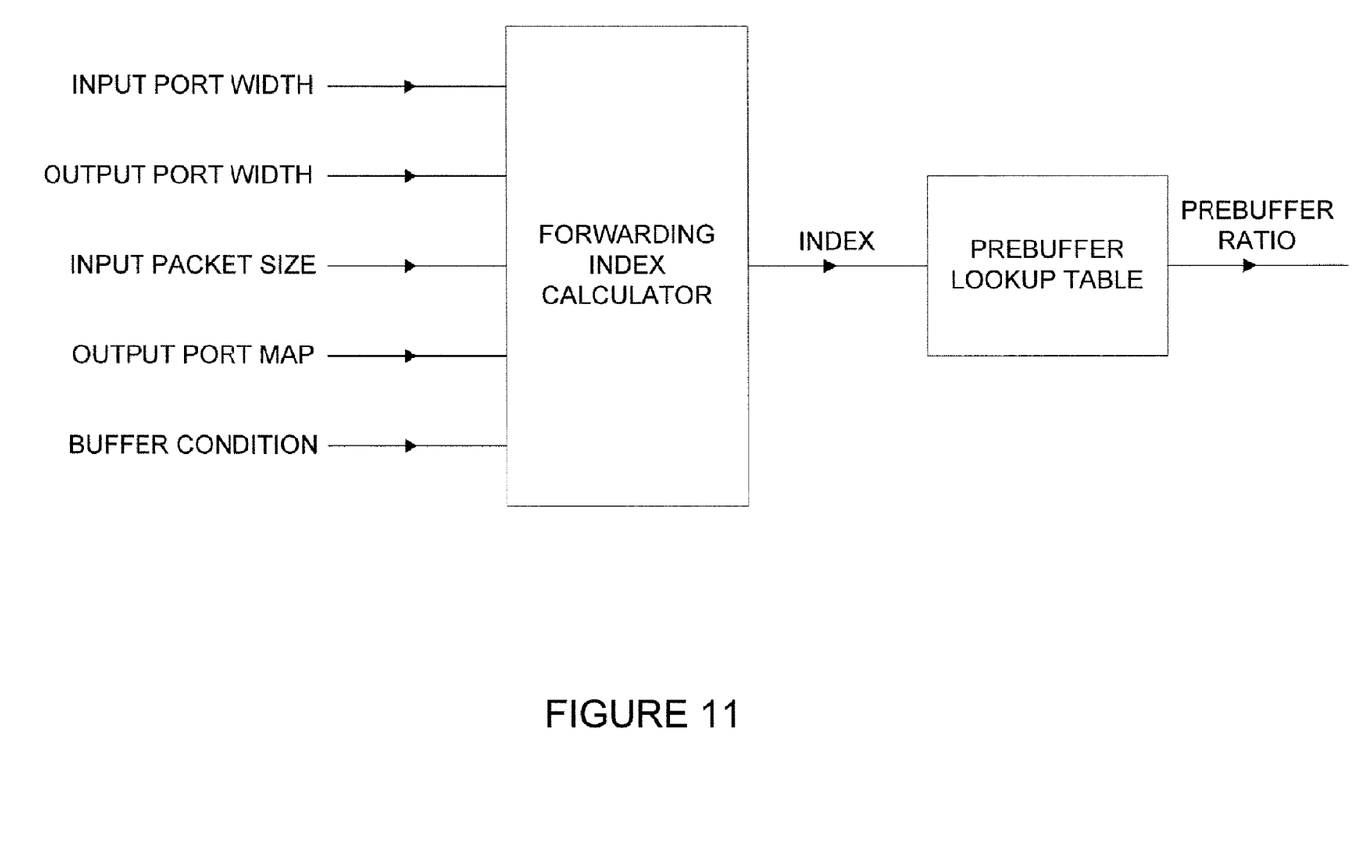
FIG. 11 is a schematic representation of a prebuffer ratio determination arrangement for the switch of FIG. 10.

In order to avoid corruption of data packets, it is necessary to ensure that at no time after commencing onward transmission does the output buffer become empty until the packet onward transmission has ended. The counter-consideration of minimising latency requires that the packet data spend no more time in the output buffer than is absolutely necessary. To achieve these aims, an optimal onward transmission start point can be determined. As shown in FIG. 11, a forwarding index calculator 101 can be used to determine a forwarding index, which can in turn be fed to a prebuffer lookup table 103 to determine a prebuffer ratio which indicates the optimal onward transmission start point. The onward transmission start point describes the amount of the packet which already must be stored in the buffer prior to commencing onward transmission of the packet. The prebuffer ratio itself is a measure of how full the output buffer should be before onward transmission commences.

As will be appreciated, the theoretical optimum onward transmission start point is the point which will result in the final byte (or other unit) of data being read out of the output buffer for onward transmission on the first clock cycle after it has been written into that buffer. However, for operational or reliability reasons, it may be desired to "de-tune" the optimum onward transmission start point from this point to one where that final byte spends one or more clock cycles in the output buffer prior to being read out to avoid unexpected write-in delays causing data corruption due to buffer under-run. Thus the prebuffer ratio determined according to the system of the present example, need not necessarily provide the theoretical minimum possible latency for the packet through the switch as reliability or other concerns may require a small increase in latency relative to that theoretical optimum in practice.

To calculate the forwarding index, a number of parameters need to be considered in order reliably to calculate an index leading to an accurate prebuffer ratio. In the present example, those parameters can include: the input port width (e.g. 1×, 4× or 12×) which represents the data write-in rate; the output port width (e.g. 1×, 4× or 12×) which represents the data read-out rate; the input packet size (i.e. number of bytes in the packet); output port map (i.e. the output port which the packet is to be transmitted from); and the buffer condition (i.e. the current available capacity in the output buffer).

The packet size can be usefully considered as the relative difference between the input and output port widths affects differently sized packets differently. For example, with a packet of 20 bytes length, an appropriate prebuffer ratio for a 4× input link width and a 12× output link width might represent ⅔ of the packet being in the output buffer prior to commencing onward transmission (ignoring packet processing overhead time), however a packet of greater or lesser length could require a greater or lesser prebuffer ratio.

The output port map can be usefully considered when determining the forwarding index, output port link width is dependent upon the output port from which the packet is to be transmitted. Also, the transmission path between input port and output port could be different for different pairs of ports within the switch.

The buffer condition can be usefully considered as the current buffer status can affect the prebuffer ratio. If the output buffer is currently empty, then the prebuffer ratio is simply dependent only upon the onward transmission of the packet under consideration. However if the output buffer already has data in it, then the prebuffer ratio is also dependent on the amount of data already in the buffer and the expected read-out rate of the data waiting for onward transmission.

Once the forwarding index calculator 101 has determined the forwarding index, the index is fed to a prebuffer lookup table 103, which is used to determine the correct prebuffer ratio for the packet. The prebuffer lookup table 103 stores a predetermined list of relationships between possible forwarding indexes and actual available prebuffer ratios for use in controlling the onward transmission of the packet from the output buffer.

The thus determined prebuffer ratio can then be used to control the onward transmission of the packet from the output buffer to achieve the desired optimum latency whilst maintaining data integrity and reliability.

Depending on the individual details and properties of the packet and the conditions and parameters within the switch, the performance improvement over a conventional store and forward system can be anywhere from approximately 10% to considerably greater than 100%, and is typically in the range 30-50%.

Thus there has now been described a method and apparatus for optimising latency of onward transmission of a packet from an Infiniband device such as a switch without compromising reliability or data integrity.

As will be appreciated, as the system can take into account, for example, current buffer status, the system can also be advantageously applied in cases where no port speed mismatch occurs. Additionally, the system can be applied statically (one time per packet) as described above, or can be dynamically applied to take into account changing buffer status etc.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A method of routing a packet between an input port and an output port of an Infiniband device, comprising:
    using an inbound data rate characteristic for the input port and an output data rate characteristic for the output port to compute a forwarding index;
    feeding the forwarding index to a buffer lookup table to determine a buffer ratio for the packet, wherein the buffer ratio specifies a minimum percentage of the packet required to be present in an output buffer associated with the output port prior to transmitting the packet;

storing the packet in an output buffer associated with the output port; and commencing transmission of the packet from the output port once a portion of the packet sufficient to satisfy the buffer ratio has been stored in the output buffer, thereby avoiding buffer under-run in the output buffer.

2. The method of claim 1, further comprising calculating the forwarding index in dependence upon a size characteristic of the packet.

3. The method of claim 1, further comprising calculating the forwarding index in dependence upon a route characteristic between the input port and the output port.

4. The method of claim 1, further comprising calculating the forwarding index in dependence upon a current status characteristic of the output buffer.

5. The method of claim 4, wherein the step of calculating the forwarding index is performed multiple times per packet.

6. The method of claim 1, wherein the device is a switch.

7. The method of claim 1, further comprising;

receiving the packet at the input port;

storing at least a header part of the packet in a buffer associated with the input port;

interrogating at least a header part of the packet to determine an output port for the packet; and forwarding the packet to the output buffer associated with the output port irrespective of a completion status of receiving the packet.

8. An Infiniband device comprising:

an input port for receiving a packet;

an output port for transmitting the packet;

an output buffer associated with the output port for storage of the packet prior to transmission thereof from the output port;

a forwarding index calculator that uses an inbound data rate characteristic for the input port and an output data rate characteristic for the output port to compute a forwarding index; and a buffer lookup table which maps the forwarding index to a buffer ratio for the packet, wherein the buffer ratio specifies a minimum percentage of the packet required to be present in the output buffer prior to transmission;

wherein the output port is configured to commence transmission of the packet from once a portion of the packet sufficient to satisfy the buffer ratio is stored in the output buffer, thereby avoiding buffer under-run in the output buffer.

9. The device of claim 8, wherein the forwarding index calculator is further operable to calculate the forwarding index in dependence upon a size characteristic of the packet.

10. The device of claim 8, wherein the forwarding index calculator is further operable to calculate the forwarding index in dependence upon a route characteristic between the input port and the output port.

11. The device of claim 8, wherein the forwarding index calculator is further operable to calculate the forwarding index in dependence upon a current status characteristic of the output buffer.

12. The device of claim 11, wherein the forwarding index calculator is operable to calculate the forwarding index multiple times per packet.

13. The device of claim 8, wherein the device is a switch.

14. The device of claim 8, further comprising:

an input buffer associated with the input port for storing the packet upon receipt; and an output port determiner for determining an output port of the device for transmission of the packet from at least a header portion of the packet;

wherein the packet is forwarded to the output buffer irrespective of a completion status of receiving the packet at the input port.

15. An Infiniband device comprising:

input means for receiving a packet;

output means for transmitting the packet;

buffer means associated with the output means for storage of the packet prior to transmission thereof from the output means;

a calculator means that uses an inbound data rate characteristic for the input means and an output data rate characteristic for the output means to compute a forwarding index; and a buffer lookup table that maps the forwarding index to a buffer ratio for the packet, wherein the buffer ratio specifies a minimum percentage of the packet required to be present in the buffer means prior to transmission;

wherein the output means is configured to commence transmission of the packet from once a portion of the packet sufficient to satisfy the buffer ratio is stored in the buffer means, thereby avoiding buffer under-run in the output buffer.

16. An Infiniband switch having an input port and a plurality of output ports, the switch configured to interrogate at least a header portion of a received packet to determine an output port for the packet and to forward the packet to an output buffer associated with the determined output port, the switch further configured to use an inbound data rate characteristic for the input port and an output data rate characteristic for the output port to compute a forwarding index, the switch further configured to map the forwarding index in a buffer lookup table to a buffer ratio for the packet, wherein the buffer ratio specifies a minimum percentage of the packet required to be present in the output buffer prior to transmitting the packet, the output port being configured to commence onward transmission of the packet once a proportion of the packet conforming to the output buffer ratio is present in the output buffer, thereby avoiding buffer under-run in the output buffer.

17. The Infiniband switch of claim 16, wherein the switch is further configured to calculate the forwarding index in dependence upon at least one of a size characteristic of the packet, a route characteristic between the input port and the determined output port, and a current status characteristic of the output buffer.

18. The Infiniband switch of claim 16, wherein the switch is configured to calculate the forwarding index multiple times per packet.

* * * * *

UNITED STATES PATENT AND TRADEMARK OFFICE
CERTIFICATE OF CORRECTION

PATENT NO. : 7,639,616 B1
APPLICATION NO. : 10/862987
DATED : December 29, 2009
INVENTOR(S) : Manula et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1226 days.

Signed and Sealed this

Ninth Day of November, 2010

David J. Kappos
*Director of the United States Patent and Trademark Office*